United States Patent
Nervig

(10) Patent No.: US 8,385,387 B2
(45) Date of Patent: Feb. 26, 2013

(54) TIME DEPENDENT EQUALIZATION OF FREQUENCY DOMAIN SPREAD ORTHOGONAL FREQUENCY DIVISION MULTIPLEXING USING DECISION FEEDBACK EQUALIZATION

(75) Inventor: Alan Thomas Nervig, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 440 days.

(21) Appl. No.: 12/783,696

(22) Filed: May 20, 2010

(65) Prior Publication Data

US 2011/0286497 A1 Nov. 24, 2011

(51) Int. Cl.
*H04B 1/00* (2006.01)
(52) U.S. Cl. ........ 375/147; 375/130; 375/140; 375/229; 375/230; 375/232; 375/233; 375/260
(58) Field of Classification Search .................. 375/147, 375/233, 260, 140, 130, 229, 232, 230
See application file for complete search history.

(56) References Cited

U.S. PATENT DOCUMENTS

| | | | |
|---|---|---|---|
| 3,488,445 A | 1/1970 | Chang | |
| 5,903,598 A | 5/1999 | Hunsinger et al. | |
| 7,099,299 B2 * | 8/2006 | Liang et al. | 370/342 |
| 7,340,000 B1 | 3/2008 | Hart et al. | |
| 7,428,261 B2 * | 9/2008 | Mills et al. | 375/148 |
| 7,599,423 B2 * | 10/2009 | Kolze et al. | 375/148 |
| 7,826,576 B1 * | 11/2010 | He et al. | 375/350 |
| 8,155,218 B2 * | 4/2012 | Hong et al. | 375/260 |
| 2005/0157670 A1 * | 7/2005 | Tang et al. | 370/320 |
| 2008/0043861 A1 | 2/2008 | Moffatt | |
| 2009/0259907 A1 | 10/2009 | Chernyshev et al. | |
| 2009/0279620 A1 | 11/2009 | Schenk | |

OTHER PUBLICATIONS

Dinis, R., et al., "Turbo Equalization with Cancellation of Nonlinear Distortion Effects for CP-Assisted and Zero-Padded MC-CDMA Signals", Vehicular Technology Conference 2007, VTC-2007 Fall. 2007 IEEE 66th, IEEE, PI, Sep. 1, 2007, pp. 1182-1187, XP031147593.
Sato, T., et al., "Two Dimensional Equalization Scheme of Orthogonal Coding Multi-Carrier CDMA under Frequency Selective Fading Environment", Universal Personal Communications, 1999. ICUPC '98. IEEE 1998 International Conference on Florence, Italy, Oct. 5-9, 1998, pp. 1215-1219, XP010315046.
Harris Corporation, International Search Report mailed Oct. 7, 2011, Application Serial No. PCT/US2011/037264.

(Continued)

*Primary Examiner* — Kenneth Lam
(74) *Attorney, Agent, or Firm* — Fox Rothschild, LLP; Robert J. Sacco

(57) ABSTRACT

System and method for equalizing an orthogonal frequency division multiplexed signal having been encoded by spreading subcarriers in the frequency domain using orthogonal codes includes receiving the signal at a receiver (300), demodulating the signal to produce demodulated information, producing a spread frequency domain representation of the demodulated information, determining an equalized representation by adjusting the power and phase of the spread frequency domain representation at least one frequency based on adjustment values, de-spreading the equalized spread frequency domain representation using the orthogonal codes to produce a de-spread frequency domain representation including received subcarriers, determining a subcarrier value for each of the received subcarriers, orthogonally spreading the determined subcarrier values using the orthogonal codes to produce a model spread frequency representation, calculating expected error values based upon the model spread frequency representation and the equalized spread frequency domain representation, and calculating new adjustment values based upon the expected error values.

22 Claims, 5 Drawing Sheets

OTHER PUBLICATIONS

Tatsunori Yui et al: "RCS2007-81: ICI Canceller o Mochiiru Turbo Fugoka MC-CDMA ni Okeru Hantei Kikan Channel Suitei [Decision-feedback channel estimation for turbo-coded MC-CDMA with ICI cancellation]", Denshi Jouhou Tsuushin Gakkai Gijutsu Kenkyuu Houkoku // Institute of Electronics, Information and Communication Engineers. Technical Report, Denshi Jouhou Tsuushin Gakkai, JP, vol. 107, No. 262, Oct. 1, 2007, pp. 7-12, XP008142272, ISSN: 0913-5685.

Written Opinion of the Int'l Preliminary Examining Authority mailed Jul. 2, 2012; International Application No. PCT/US2011/037264 in the name of Harris Corporation.

* cited by examiner

TIME DEPENDENT EQUALIZATION OF FREQUENCY DOMAIN SPREAD ORTHOGONAL FREQUENCY DIVISION MULTIPLEXING USING DECISION FEEDBACK EQUALIZATION

BACKGROUND OF THE INVENTION

1. Statement of the Technical Field

The invention is directed to a communication system. In particular, the invention is directed to a system and method for applying Decision Feedback Equalization (DFE) techniques in the receiver of a communication system that employs spreading in the frequency domain of a communication signal modulated according to orthogonal frequency division multiplexing (OFDM).

2. Description of the Related Art

In OFDM communication systems, the frequencies and modulation of a frequency-division multiplexing (FDM) communication signal are arranged orthogonal with each other to eliminate interference between signals on each frequency. The low-rate modulation and relatively low symbol rate of an OFDM system compared to the channel time characteristics reduces the system's sensitivity to multipath propagation issues. In an OFDM system, a number of low symbol-rate data streams are transmitted on separate narrow band subcarriers using multiple frequencies simultaneously instead of transmitting a single, high symbol-rate stream on one wide frequency channel. These multiple subcarriers have the advantage that the channel propagation effects are generally more constant over a given sub-channel than over the entire channel as a whole. A signal modulated with conventional in-phase/quadrature (I/Q) modulation can be transmitted over the individual subcarriers.

An OFDM signal can be considered the sum of a number of orthogonal subcarrier signals, with baseband data being independently modulated on each individual subcarrier, for example, by Quadrature Amplitude Modulation (QAM) or Phase-Shift Keying (PSK). The subcarrier signals may be combined for transmission through the use of an N point Inverse Fast Fourier Transform algorithm (IFFT), where N is equal to the number of subcarriers. The output of the IFFT is typically modulated by a main Radio Frequency (RF) carrier. A receiver, after demodulating the received signal from the main RF carrier can reconstruct the subcarriers by performing a Fast Fourier Transform (FFT) on the received signal.

OFDM communication systems have high spectrum efficiency (a high number of bits per second per Hz of bandwidth), simple mitigation of multipath interference, and enhanced noise immunity compare to many other communication systems. However, OFDM communications systems suffer from carrier frequency offsets, timing drift, and non zero Doppler spread, which cause time variations in the phase of the channel. Additionally, frequency selective fading in the channel may cause transmission nulls within the OFDM signal's transmission spectrum.

The receiver that is to receive the OFDM signal requires a minimum signal-to-noise ratio (SNR) per subcarrier in order to demodulate and decode the signal with an acceptably low bit error rate (BER). If there is other unwanted energy within the transmission spectrum, the SNR can decrease causing an increase in BER. The unwanted energy can be noise from other sources. A conventional OFDM signal is susceptible to such interferers because of the required minimum SNR per subcarrier for an acceptably low BER. Further, frequency selective fading in the channel causes transmission nulls within the OFDM signal's transmission spectrum, which selectively reduces the SNR on certain subcarriers within those nulls, depending on their frequency location, leading to an undesirable increase in BER.

U.S. Patent Application Publication No. 2008/0043861, which is incorporated by reference herein, describes the use of orthogonal transforms to spread OFDM signals in the frequency domain in order to lessen the effects of narrow band interference. Spreading the OFDM signal in the frequency domain can reduce the effect of frequency selective fading by providing frequency-domain processing gain.

Generally, a wireless communication receiver requires an equalizer to account for the effects of the RF carrier signal propagating from a transmitter to the receiver. For example, effects due to multipath fading must be accounted for. Multipath fading can cause both amplitude and phase variation across the channel. Multipath fading is caused by objects in the environment that act as reflectors to create multiple paths that a transmitted signal traverses. At the receiver, multiple copies of the transmitted signal are received. Based on differences in the received phase, delay, and amplitude of each of the copies, the composite received signal will be attenuated differently and have a different phase at different frequencies. For example, at some frequencies, the multiple copies of the signal will constructively interfere such that the power received at the receiver is higher than it would be if only one of the copies was received. At other frequencies, the received copies destructively interfere such that the received signal is attenuated. If the transmitter, receiver, and all of the reflectors are completely at rest, the power received at a given frequency will typically remain constant. However, if the transmitter, receiver, or reflectors are moving, the received power will vary at a rate that is dependent on the transmission frequency and the relative velocity of the transmitter, receiver, and reflectors. Additionally, timing offsets between the transmitter and the receiver, i.e., the relative error associated with the reference clocks included in the transmitter and the receiver, can also cause phase variation across the channel.

The equalizer structure generally used in OFDM systems places the channel equalization/tracking function within the de-spread domain. However, with frequency spread OFDM, this equalization solution only works for the case when the channel can be represented by a universal phase offset. Thus, this simple equalizer structure is inappropriate for more general cases involving timing drift and/or time dependent multipath.

Thus, there is a need for a generally applicable time dependent equalization solution for frequency domain spread OFDM.

SUMMARY OF THE INVENTION

According to an aspect of the invention a method and system is provided for equalizing an orthogonal frequency division multiplexed (OFDM) signal using a decision feedback equalizer in the spread frequency domain. The spread frequency domain is defined in the present application as a frequency domain representation of a signal that has been spread in the frequency domain using one or more orthogonal codes.

In an embodiment of the invention, a transmitter spreads the subcarriers of an OFDM signal in the frequency domain using orthogonal codes. The OFDM signal, including the frequency spread subcarriers, is transmitted via a communication channel to a receiver.

In the receiver, the OFDM signal is received and demodulated. A portion of the demodulated information is converted to digital samples. In the receiver, a spread frequency domain representation of the demodulated information is produced, for example by performing a Discrete Fourier Transform (DFT) or a Fast Fourier Transform (FFT). The spread frequency domain representation of the demodulated information may be a vector, i.e., a 1 dimensional matrix or array, of complex values, each of the complex values representing a power and a phase at a particular frequency.

An equalized spread frequency domain representation is determined by adjusting the power and phase of the spread frequency domain representation over a range of frequencies based on adjustment values.

The equalized spread frequency domain representation of the demodulated information is then de-spread using the same orthogonal codes that were used to spread the signal in the transmitter. The de-spread frequency domain representation includes a plurality of subcarriers.

A decision slicer in the receiver determines a subcarrier value for each of the received subcarriers. The determined subcarrier values are then processed further to extract the information sent from the transmitter to the receiver.

The determined OFDM subcarrier values are also used to adjust the equalizer for subsequently received information. The determined OFDM subcarrier values are orthogonally spread in the frequency domain using the same orthogonal codes that were used in the transmitter. The output of the decision slicer, if the decision slicer determined the subcarrier values correctly, represents the expected received information in the spread frequency domain, i.e., the information that would have been received by the receiver if the transmission channel had been perfectly equalized and there where no noise or interference present.

The resulting spread frequency domain representation of the determined OFDM subcarrier values, which is the model or ideal result, is compared to the equalized spread frequency domain representation of the demodulated information. This comparison produces an error estimate in the spread frequency domain that represents the difference between the desired input to the decision slicer and the actual input to the decision slicer.

New adjustment values are then calculated based upon the error estimate in the spread frequency domain. The new frequency domain adjustment values are used to equalize a next portion of demodulated information. The information demodulated by the receiver is thereby equalized according to the error associated with previously received information. The frequency domain adjustments may be based on the filtered values of errors over several previous time domain symbols, or in the case of an infinite impulse response (IIR) filter, over all previous time domain symbols.

DESCRIPTION OF THE DRAWINGS

Embodiments will be described with reference to the following drawing figures, in which like numerals represent like items throughout the figures, and in which.

DETAILED DESCRIPTION

Figure 1:
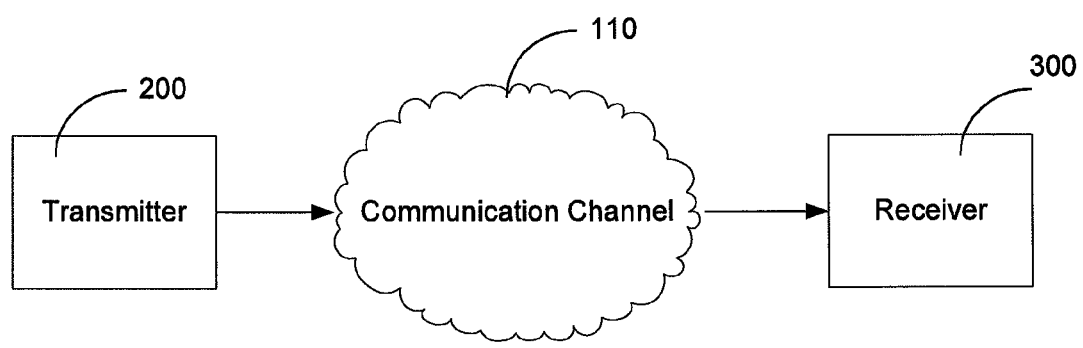
FIG. 1 is a block diagram of a communication system according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Referring now to FIG. 1, there is provided a block diagram of a communication system in accordance with an embodiment of the present invention. As shown in FIG. 1, the communication system 100 includes a transmitter 200 and a receiver 300 that communicate with one another via a communication channel 110. Although not illustrated in FIG. 1, typically the communication system 100 will be bi-directional, i.e., each device connected to the communication system 100 will include both a transmitter and a receiver. The communication channel 110 is a wired or wireless medium that allows a signal transmitted by the transmitter 200 to propagate to, and be received by, the receiver 300. The communication channel 110 may include both wireless and wired components. Additionally, the communications channel can include active components, such as repeaters, hubs, and gateway devices. Although described herein in the context of a wireless transmission from a transmitter to a receiver, it should be appreciated that the systems and methods described herein are also applicable to other types of communications systems.

Figure 2:
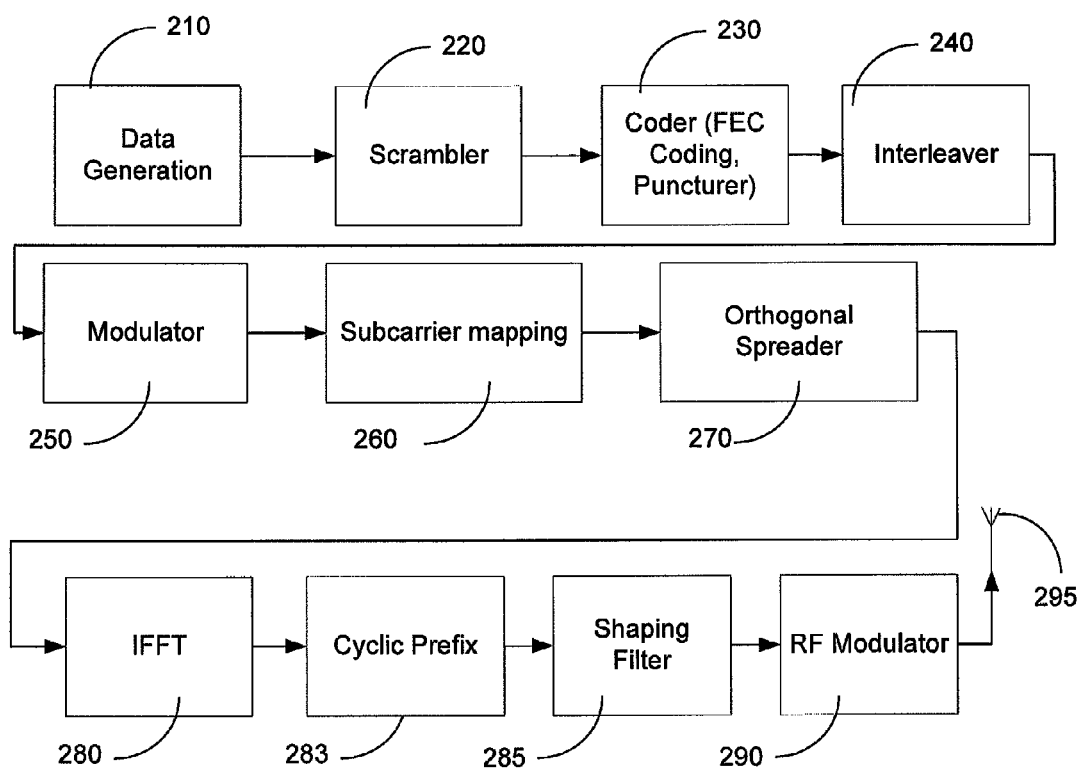
FIG. 2 is a high level block diagram of an OFDM transmitter according to an embodiment of the invention.

Referring now to FIG. 2, a simplified high level block diagram of an OFDM transmitter in accordance with an embodiment of the present invention is provided. The transmitter 200 includes a data generation block 210, a scrambler block 220 connected to the output of the data generation block 210, a coder block 230 connected to the output of the scrambler block 220, an interleaver block 240 connected to the output of the coder block 230, a modulator block 250 connected to the output of the interleaver block 240, a cyclic prefix block 255 connected to the output of the modulator block 250, a subcarrier mapping block 260 connected to the output of the cyclic prefix block 255, an orthogonal spreader block 270 connected to the output of the subcarrier mapping block 260, an IFFT block 280 connected to the output of the orthogonal spreader block 270, a shaping filter block 285 connected to the output of the IFFT block 280, an RF modulator block 290 connected to the output of the shaping filter block 285, and a transmit antenna 295 connected to the output of the RF modulator block 290. Although described as illustrated in FIG. 2, there are many different possible methods of implementing the OFDM transmitter 200. For example, the order in which the functions provided for by the different illustrated blocks may be modified. Additionally, not all of the functions provided by the described block are required. Although FIG. 2 illustrates only a single transmit antenna 295, as is well known in the art, multiple transmit antennas may be used to provide for diversity transmission and/or beam-forming.

The data to be transmitted is first generated in the data generation block 210. The data may be provided by a user, generated by the transmitter 200 itself, or provided to the transmitter 200 by another device. The data is then provided to the scrambler block 220. The scrambler block 220 replaces sequences of data with other data to reduce the probability that the output of the scrambler block 220 will contain repetitive data, such as all zeros or all ones. The scrambled data is then provided to a coder block 230, which performs forward error correction (FEC) coding and possibly puncturing. Generally, redundant data is added in the coder block 230 such that a receiver may be able to detect and correct errors without the need for the transmitter 200 to resend the data. The coded data is then provided to the interleaver 240, which interleaves the data to make the data more robust with respect to bursts of errors, i.e., errors that occur closely with respect to time.

The data is then mapped into symbols by the modulator block 250. For example, the modulator block 250 may map the data according to Quadrature Amplitude Modulation (QAM) or Quadrature Phase Shift Keying (QPSK). Thus, the output of the modulator block 250 may be a series of in-phase (I) and quadrature (Q) values. Each pair of I and Q values represents a particular modulation symbol. In some embodiments, each pair of I and Q values may be represented by a single complex number. Thus, the output of the modulator may be a series of complex numbers representing modulation symbols.

The modulation symbols are then provided to the subcarrier mapping block 260. The subcarrier mapping block 260 takes as its input the modulation symbols produced by the modulator block 250. The symbols are mapped to N subcarriers, for example, 64 subcarriers. Each subcarrier has a symbol rate equal to the input symbol rate divided by N. Thus, the data is split into multiple streams, each stream having a relatively low data rate.

The values associated with each of the N subcarriers, i.e., the subcarrier values, are then provided to the orthogonal spreader block 270. The orthogonal spreader block 270 may perform a Walsh transform on the input subcarrier values.

Walsh transforms are typically used in communications systems such as CDMA for time-domain spreading and for creating orthogonal codes for multiple access schemes. The Walsh transform can be used in the system, apparatus, and method of the present invention to spread subcarriers over the frequency domain. This can provide a significant reduction in the average power (dBm/Hz/sec) allowing more transmit power within the same FCC spectral mask and reducing the effect of frequency selective fading by providing frequency-domain processing gain. Spreading the subcarriers over the frequency domain also lessens the effects of spectrum nulls that might be caused by multipath or by a preceding removal of narrowband interference. Because each subcarrier is spread over the frequency domain, the system is also less susceptible to interference from narrow band interferers. Applying a Walsh transform can lessen the effects of narrow band interference because each subcarrier is spread over the frequency domain such that a narrow band interferer or a notch in the frequency response of the communication channel 110 will not completely interfere with the information transmitted on a given subcarrier. Additionally, if there are fewer subcarriers as compared to the IFFT size and the spreading code length, more processing gain may be realized from frequency domain spreading. By adjusting the size of the IFFT and spreading code length relative to the number of subcarriers, a trade-off can be made with respect to the number of carriers, the data rate, and the transmit power for the same FCC spectral mask.

The orthogonal spreading block 270 may perform a matrix operation on the input subcarrier values. Matrix operations are well known to persons skilled in the art, and therefore will not be described herein. However, it should be understood that any such matrix operation can be used without limitations. For example, a Walsh matrix based operation can be performed by orthogonal spreading block 270.

The output of the orthogonal spreading block 270, which is in the spread frequency domain, is provided to the IFFT block 280. In the IFFT block 280, the spread output of the orthogonal spreading block 270, which is in the frequency domain, is converted to the time domain. A cyclic extension as a guard interval may also be added.

The symbol outputs of the IFFT block 280 are provided to the cyclic prefix block 283. The cyclic prefix block 283 performs prefixing of each symbol output with a repetition of the its end. The prefixed symbols are then provided to the shaping filter block 285. At the shaping filter block 285, the prefixed symbols are processed to limit the effective bandwidth of the information to be transmitted.

The RF Modulator block 290 modulates the output of the shaping filter onto an analog RF carrier signal, which is transmitted via the transmit antenna 295 to the receiver 300.

Figure 3:
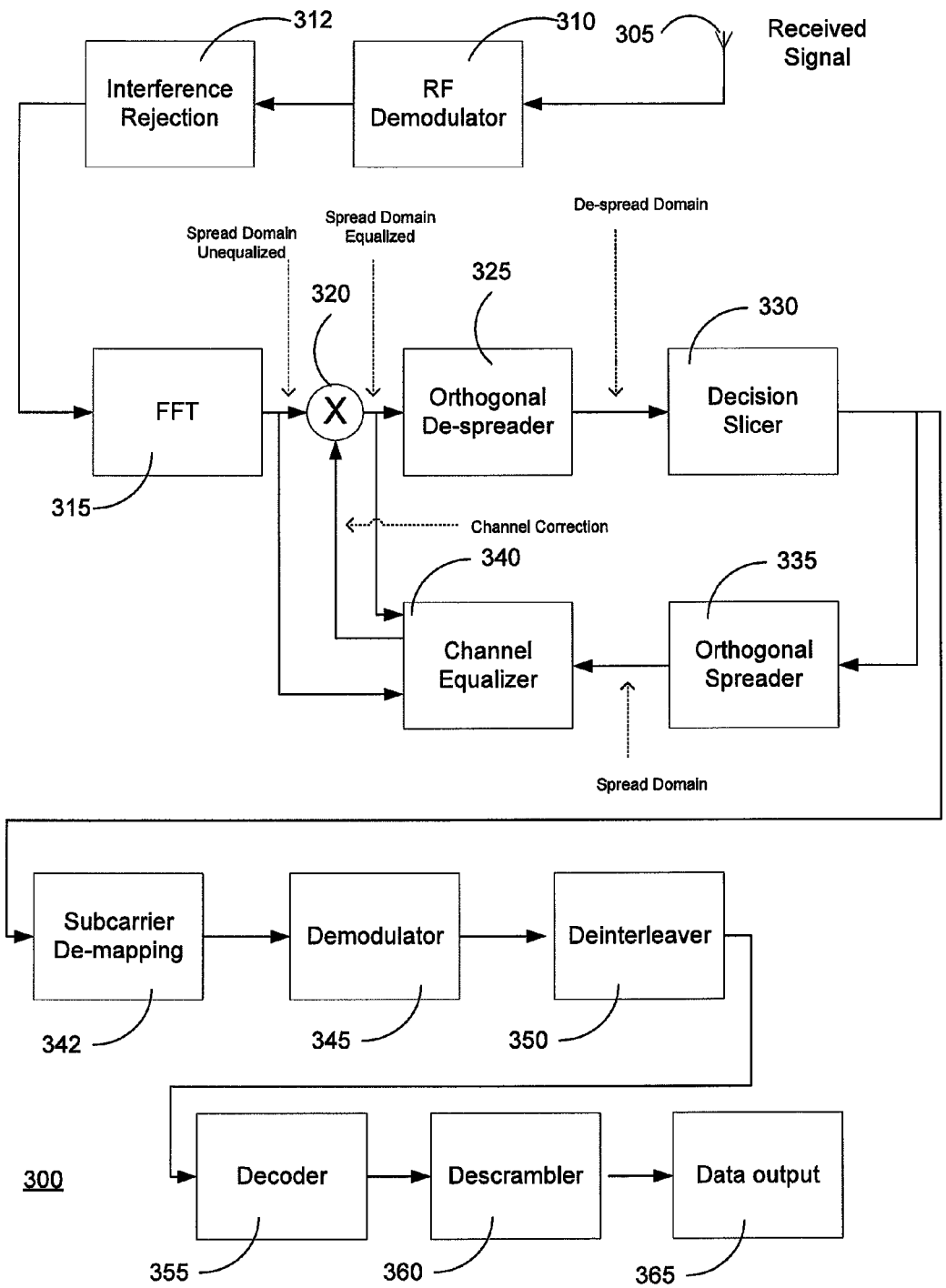
FIG. 3 is a high level block diagram of an OFDM receiver according to an embodiment of the invention.

Referring now to FIG. 3, a simplified high level block diagram of a receiver in accordance with an embodiment of the present invention is provided.

The receiver includes a receive antenna 305 that receives the OFDM signal sent by the transmitter 200 via the communication channel 110. The OFDM signal, which is an RF carrier signal having information modulated onto the signal, is provided to the RF demodulator block 310. The RF demodulator block 310 demodulates the information provided on the analog RF carrier and outputs digital baseband data samples representing the modulated data. The baseband data sample may be in the form of a stream of pairs of I and Q data values. Each pair of I and Q values may be represented by a single complex number.

The output of the RF demodulator block 310 contains the information that was modulated onto the RF carrier by the transmitter 200. However, generally, the output of the modulator will also include interferers such as wideband noise and other narrowband interferers. Additionally, due to the effects of the propagation of the RF signal from the transmitter 200 to the receiver 300, the output of the RF modulator block 310 may not exactly match the information that was modulated onto the RF carrier by the transmitter 200. For example, due to multipath fading, the received RF signal will be attenuated differently at different frequencies, i.e., the frequency response will not be flat. Additionally, received signal will have an RF phase offset associated with it. Additionally, the frequency response may vary with time.

The output of the RF demodulator block 310 may be provided to an interference rejection block 312. The interference rejection block 312 detects narrowband interferers included in the output of the RF demodulator block and performs a filtering operation to remove or attenuate the detected interferers. For example, the interference rejection block 312 may implement a Fast Fourier Transform (FFT) to detect an interferer in the frequency domain and implement an adjustable finite impulse response (FIR) or IIR notch filter to selectively attenuate the interferer.

The FFT block 315 is generally configured to perform frequency modulation. The frequency modulation can be achieved by applying an FFT to the output of interference rejection block 312. Notably, the FFT applied by the FTT block 315 is performed at a lower resolution than the FFT performed at block 312. In this regard, it should be understood that the frequency separation performed at block 315 is performed at the OFDM symbol separation.

In a conventional OFDM receiver, the output of the FFT block 315 would correspond to subcarrier values encoded on the N subcarriers. However, in the system according to an embodiment of the present invention, the output of the FFT block 315 is in the spread frequency domain, i.e., the output corresponds to a frequency spread version of the subcarrier values encoded on the N subcarriers. The size of the FFT operation performed in the FFT block 315, i.e., the number of points, should generally match the size of the IFFT performed in the transmitter 200. The size of the IFFT and the FFT operations need not be equal to the number of subcarrier values. For example, if there are fewer subcarrier values as compared to the length of the spreading codes and the IFFT and FFT sizes, additional processing gain may be realized from frequency domain spreading.

Blocks 320, 325, 330, 335, and 340 collectively form a decision feedback equalizer. The decision feedback equalizer uses previous decisions made by the receiver 300 to equalize the information received at the receiver.

For each sample, the output of the FFT 315 is a series of values having a length M equal to the size of the FFT, which represents the demodulated information in the un-equalized spread frequency domain. In the multiplier block 320, each of the M values is multiplied by a respective value produced by the channel equalizer block 340 to thereby perform the channel equalization. If the outputs of the FFT block 315 and the channel equalizer block 340 are each represented as vectors of length M, then the multiplier block 320 performs an element by element multiplication on the two vectors. For example, if the output of the FFT block 315 is a vector equal to [a b c] and the output of the channel equalizer block 320 is a vector equal to [d e f] then the output of the multiplier block 320 would be a vector equal to [a*d b*e c*f].

For each sample, the output of the multiplier block 320 is a vector of length M in the equalized spread frequency domain. The equalized output of the multiplier 320 is provided to the orthogonal de-spreader 325. The orthogonal de-spreader 325 de-spreads the input vector using the same orthogonal codes that were used in the transmitter 200 to spread the subcarriers. Thus, the output of the orthogonal de-spreader 325 corresponds to the subcarrier values encoded on the N subcarriers by the transmitter 200.

The output of the orthogonal de-spreader block 325, which is in the de-spread domain, is provided to the decision slicer block 330. The decision slicer block 330 may include a hard slicer. Alternatively, a soft slicer may be used. If the decision slicer block 330 includes a hard slicer, the decision slicer block 330 makes a decision as to what subcarrier value each sample of the input data corresponds to. If a soft slicer is used, the output of the decision slicer block 330 represents statistical expected values of the subcarrier values. In the following description, a hard slicer is assumed.

As an example of the operation of the decision slicer block 330, if 64 subcarriers were used in the transmitter to encode the data, for each sample or group of samples, the decision slicer will make 64 decisions with respect to what subcarrier value each sample or group of samples corresponds to. Because noise and other interference is generally added to the RF signal as it propagates from the transmitter 200 to the receiver 300, the number of bits used to represent the data up to the decision slicer block 330 will typically be larger than the number of bits actually required to represent a particular subcarrier value. For example, if the data was originally modulated using 16 QAM modulation, a total of 4 bits (2 for the in-phase (I) component and 2 for the quadrature (Q) component) would be required to encode each subcarrier value. However, up to the decision slicer block 330, more bits may be used to represent the received information. Additionally, the sample rates used in the RF demodulator block 310 to convert the information demodulated from the received RF carrier signal from analog to digital form and in the FFT block 315 to convert the information to the frequency domain may be selected such that the sample rate at the output of the FFT block 315 is greater than the final OFDM symbol rate. Thus, based on the higher resolution both with respect to time and amplitude, the decision slicer makes a decision with respect to what subcarrier value each sample or group of samples corresponds to.

The output of the decision slicer block 330 corresponds to the subcarrier values encoded on the N subcarriers by the transmitter 200 at the OFDM symbol rate. The output of the decision slicer block 330 is provided to the subcarrier de-mapping block 342 and subsequently to the demodulator 345, de-interleaver 350, decoder 355, and descrambler 360 blocks, which perform the inverse function of the previously described subcarrier mapping block 260, modulator block 250, interleaver block 240, coder block 230, and scrambler block 220, respectively. The data output block 365 represents the output of the receiver 300. The data output block 365 provides the received data to the device that contains the receiver 300, to a separate device via a network connection to be further processed, or to a user.

The output of the decision slicer block 330 is also provided to the orthogonal spreader block 335. The orthogonal spreader block 335 spreads the output of the decision slicer block 330 in the frequency domain using the same orthogonal spreading codes used by the orthogonal spreader block 270 in the transmitter. Thus, assuming the decision slicer block 330 made a correct decision, the output of the orthogonal spreader block 335 represents the expected received signal in the spread frequency domain, i.e., the signal that would have been received by the receiver 300 if the transmission channel 110 had been perfectly equalized and there where no noise or interference present.

The channel equalizer block 340 operates in the spread frequency domain to equalize the channel by comparing the output of the multiplier 320 in the equalized spread frequency domain with the expected received signal in the spread frequency domain. Based on the comparison, the channel equalizer block 340 provides a series of values to the multiplier block 315 to be used to multiply the output of the FFT block 315 to thereby equalize the channel by adjusting the phase and amplitude of the signal in the spread frequency domain. If the output of the FFT block 315 and the channel equalizer block 340 are each represented as vectors of length M then the multiplier block 320 performs an element by element multiplication operation on the two vectors.

There are many possible implementations of the channel equalizer block 340. For example, the channel equalizer block 340 may implement an adaptive filter algorithm such as the Least-Mean-Square (LMS) algorithm or the normalized LMS algorithm to perform the equalization function. Alternatively, other known decision feedback equalization techniques may be used.

Figure 4:
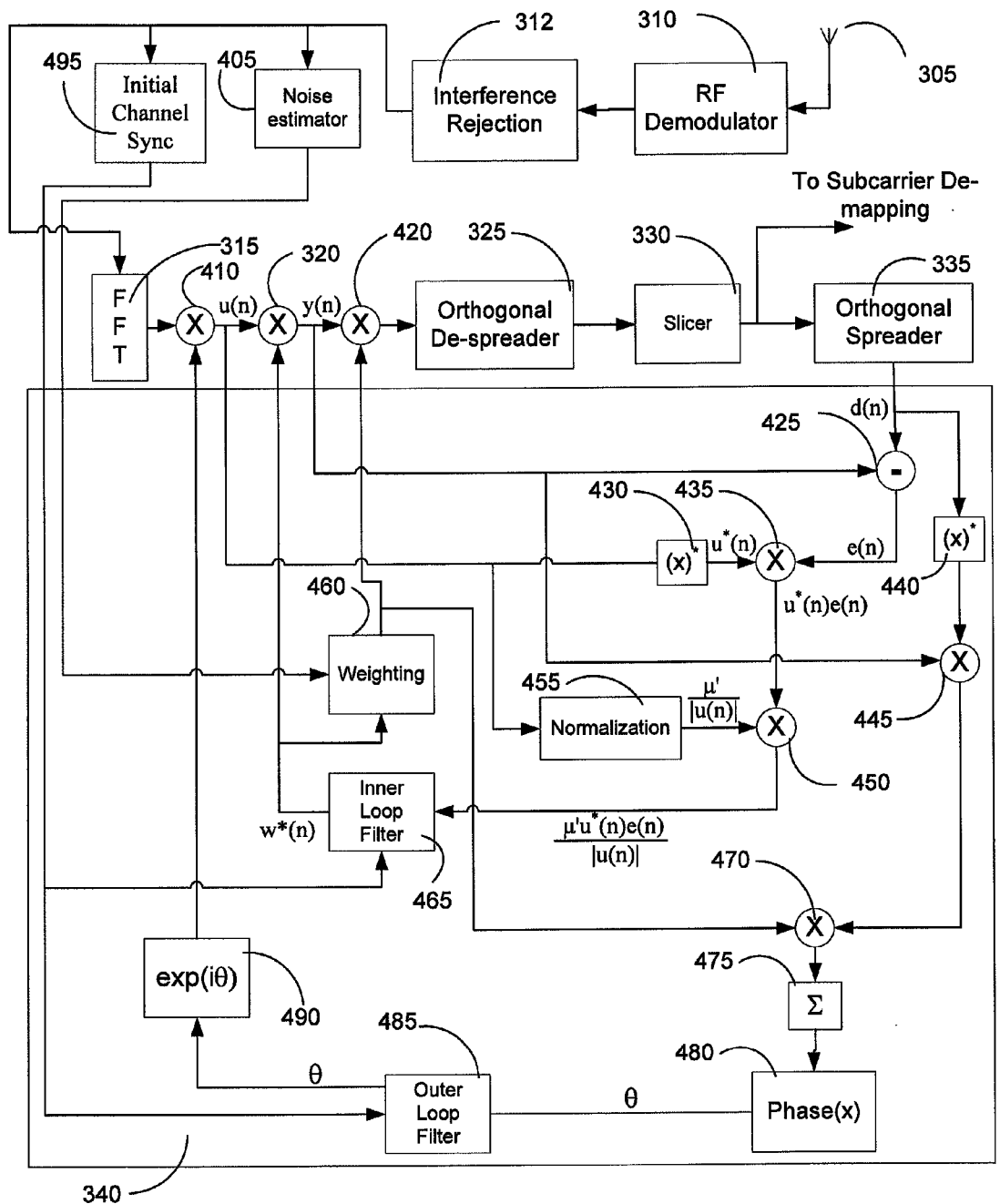
FIG. 4 is a high level block diagram of a receiver according to an embodiment of the invention that employs the Least-Mean-Square (LMS) algorithm, and a phase lock loop (PLL).

Referring now to FIG. 4, a high level block diagram of the decision feedback equalizer portion of an embodiment of an OFDM receiver 300 that employs the Least-Mean-Square (LMS) algorithm is illustrated. The equalizer block 340 employs a double equalization tracking loop. An inner loop employs the LMS algorithm to track general channel variation over the frequency spread subcarriers. Additionally, an outer Phase Locked Loop (PLL) is employed to track and compensate for a universal phase offset. Additionally, the equalizer block 340 contains a weighting function.

In an embodiment of the present invention, the inner loop employs the LMS algorithm to track general channel variation over the frequency spread subcarriers and to compensate for the variation. Specifically, the equalizer block uses a first order LMS filter to provide equalization in the spread frequency domain. The LMS algorithm can be summarized as follows for a first order filter, i.e., a filter having a single tap:

Filter output: y(n)=w*(n)u(n)
Error estimate: e(n)=d(n)−y(n)
Next filter tap weight: w(n+1)=w(n)+μu(n)e*(n)
where x* is the complex conjugate of x;
  u(n) is the complex filter input for sample n;
  w(n) is the complex current tap weight for sample n;
  d(n) is the complex estimated expected filter output for sample n; and
  μ is a real scaling value that controls the rate of adaptation of the filter.

The complex conjugate of the next tap weight can be calculated as follows:

$$w^*(n+1) = (w(n) + \mu u(n)e^*(n))^*$$
$$= w^*(n) + (\mu n(n)e^*(n))^*$$
$$= w^*(n) + \mu^* u^*(n)e(n)$$

Because μ is a real value μ*=μ, thus:

w*(n+1)=w*(n)+μu*(n)e(n)

In the LMS algorithm, the correction applied to the filter tap weight, i.e., μu*(n)e(n), is proportional to the filter input u(n). Thus, when u(n) is large the algorithm may experience a gradient noise amplification problem. To account for this, the real scaling value u can be redefined to depend upon the magnitude of the input u(n) such that:

μ=μ'/|u(n)| where μ' is a real scaling value that controls the rate of adaptation of the filter;
  (n) is a time domain subscript;
  u(n) is a vector in the frequency domain; and
  |u(n)| is a vector norm of the vector u(n) or the absolute value of a complex frequency component for sample n.

Referring again to FIG. 4, the receive antenna 305 receives the OFDM signal sent by the transmitter 200 via the communication channel 110. The RF demodulator block 310 demodulates the information provided on the received analog RF carrier signal and outputs digital baseband data samples representing the modulated data.

The output of the RF demodulator block 310 may be provided to the interference rejection block 312. The interference rejection block 312 detects narrowband interferers included in the output of the RF demodulator block and filters the input data to remove or attenuate the detected interferers. For example, the interference rejection block 312 may implement a Fast Fourier Transform (FFT) to detect an interferer and implement an adjustable finite impulse response (FIR) or IIR notch filter to attenuate the interferer.

A Fast Fourier Transform (FFT) is applied to the output of the interference rejection block 312 in the FFT block 315. For each sample, the output of the FFT block 315 is a vector of length M representing the subcarriers in the spread frequency domain. If the received signal was encoded with N subcarriers, in a conventional OFDM receiver, the output of the FFT block 315 would correspond to subcarrier values encoded on the N subcarriers. However, in the system according to an embodiment of the present invention, the output of the FFT block 315 is in the spread frequency domain, i.e., the output corresponds to a frequency spread version of the subcarrier values encoded on the N subcarriers. Depending on the length of the spreading code used to spread the data in the transmitter 200 and the size of the IFFT operation in the transmitter 200, the length M of the vector representing the spread subcarriers may be larger than the number of subcarriers N.

The multiplier block 410 is part of the outer phase tracking loop. At the multiplier block 410, each of the M values in the vector that is output by the FFT block 315 is multiplied by the same complex value having a unity gain and a particular phase. Each of the M values in the vector is thereby adjusted by the same phase offset.

The blocks that make up the inner loop of the channel equalizer block 340 effectively perform the LMS algorithms in parallel M times to thereby equalize the channel in the spread frequency domain. As noted above, if |u(n)| is a vector norm of the vector u(n)), then the normalization is the same for all frequencies. If |u(n)| is the absolute value of a complex frequency component for sample n, then the normalization is different for every frequency.

The output of the multiplier 410 is provided to the input of the multiplier 320. Each of the M outputs of the multiplier 410 corresponds to one of the M inputs u(n) of the M parallel implementations of the LMS algorithm described above. In the multiplier block 320, an element by element multiplication operation is performed on the vector of M values provided by the multiplier 410 and a vector of length M output by the first order inner loop filter 465. Each of the values in the vector output by the inner loop filter 465 corresponds to the complex conjugate of the tap weight, i.e., w*(n), of the LMS algorithm.

The output of the multiplier 320 is a vector of length M. Each of the M values corresponds to the filter output y(n) of the LMS algorithm. The result of an element by element multiplication of the output of the multiplier 320 and a weighting vector of length M is provided to the orthogonal de-spreader 325.

The orthogonal de-spreader 325 de-spreads the input vector using the same orthogonal codes that were used in the transmitter 200 to spread the N subcarriers in the frequency domain. Thus, the output of the orthogonal de-spreader 325 corresponds to the subcarrier values encoded on the N subcarriers by the transmitter 200.

The output of the orthogonal de-spreader block 325, which is in the de-spread frequency domain, is provided to the decision slicer block 330. The decision slicer block 330 makes a decision as to what value each sample of the input data corresponds to.

For each sample, the output of the decision slicer block 330 is a vector of length N corresponding to the subcarrier values encoded on the N subcarriers by the transmitter 200 at the OFDM symbol rate. The output of the decision slicer block 330 is provided to the subcarrier de-mapping block 342 and subsequently to the demodulator 345, de-interleaver 350, decoder 355, and descrambler 360 blocks, which perform the inverse function of the previously described subcarrier mapping block 260, modulator block 250, interleaver block 240, coder block 230, and scrambler block 220, respectively. The data output block 365 represents the output of the receiver 300. The data output block 365 provides the received data to the device that contains the receiver 300, to a separate device via a network connection to be further processed, or to a user.

The output of the decision slicer block 330 is also provided to the orthogonal spreader block 335. The orthogonal spreader block 335 spreads the output of the decision slicer block 330 in the frequency domain using the same orthogonal spreading codes used by the orthogonal spreader block 270 in the transmitter. Thus, assuming the decision slicer block 330 made a correct decision, the output of the orthogonal spreader block 335 represents the expected received signal in the spread frequency domain, i.e., the signal that would have been received by the receiver 300 if the transmission channel 110 had been perfectly equalized and there where no noise or interference present. Thus, each of the M values in the vector output by the orthogonal spreader 335 corresponds to the estimated expected value d(n) in the LMS algorithm.

The vector output by the multiplier 320 is subtracted from the vector of expected values in the subtractor block 425 to produce an output vector of length M. Each of the values included in the vector output by the subtractor 425 corresponds to the error estimate e(n) of the LMS algorithm, where e(n)=d(n)−y(n).

The complex conjugate block 430 takes as an input the vector corresponding to the input to the filter u(n) of the LMS algorithm and produces the complex conjugate of each of the vector elements.

Multiplier block 435 outputs the element by element multiplication of the vector corresponding to the error estimate e(n), which is output by the subtractor block 425, and the output of the complex conjugate block 430. Each of the values included in the vector output by the multiplier block 435 corresponds to u*(n)e(n) of the LMS algorithm.

The normalization block 455 takes as an input the output of the multiplier block 410, which is a vector of M values, each of the M values corresponding to the input to the filter u(n) of the LMS algorithm. The normalization block 455 produces as an output a vector of length M of real values that control the rate of adaptation of the M parallel filters. Each of the M values in the scaling vector is normalized by |u(n)|. As noted above, if |u(n)| is a vector norm of the vector u(n), then the normalization is the same for all frequencies. If |u(n)| is the absolute value of a complex frequency component for sample n, then the normalization is different for every frequency.

The output of the multiplier block 450 is the element by element multiplication of the output of the multiplier block 435 and the output of the normalization block 455. The output of the multiplier block 450 corresponds to the normalized correction factor of the LMS algorithm, i.e., μ'u*(n)e(n)/(|u(n)|) and is provided to the inner loop filter block 465.

The inner loop filter block 465 may be a first order infinite impulse response (IIR) filter that updates the complex conjugate of the tap weight w*(n+1) for the next iteration of the LMS algorithm, i.e., for the next sample. The output of the inner loop filter 465 is a vector of M values, each of the M values corresponding to w*(n+1) of the LMS algorithm where:

$$w^*(n+1)=w^*(n)+\mu'u^*(n)e(n)/(|u(n)|)$$

The output of the inner loop filter 465 is used to equalize the next sample of demodulated information. Thus, information demodulated by the receiver is equalized according to the error associated with previously received information.

The inner loop filter block 465 also includes an input for initialization of the inner loop filter 465. The initial channel synchronization block 495 produces and output that resets the inner loop filter block 465 to default values based on the output of the RF demodulator 310.

The channel equalizer block 340 may also include an outer phase locked loop (PLL) to track and correct for a composite phase error for all of the frequency spread subcarriers. The PLL operates by comparing the sum of the phase errors associated with the frequency spread subcarriers and adjusting the phase of all of the frequency spread subcarriers according to the average phase error.

Complex conjugate block 440 takes as its input a vector of M values that represents the estimated expected value d(n) of the frequency spread subcarriers and produces the complex conjugate of each of the values.

Multiplier block 445 produces the element by element multiplication of the output of the complex conjugate block 440 and the output of multiplier block 320, which is a vector of M values in the equalized spread frequency domain. The output of the multiplier block 445 is a vector of M values representing the phase error in each of the M discrete frequencies in the spread frequency domain.

In block 470, the output of the multiplier block 445, which represents the phase error in each of the M spread subcarriers, is multiplied by a weighting vector.

In block 475, the M values that represent the phase errors associated with the frequency spread subcarriers are summed together to produce an average phase offset. By summing the M spread subcarriers together, the resulting output will have a higher signal to noise ratio (SNR) which allows for a faster outer PLL loop.

In block 480, a real phase value is calculated from the single complex number output by block 475.

The outer loop filter 485 is a low pass filter that filters the real phase value. The outer loop filter 485 may be a second order low pass IIR filter. The speed of the outer PLL loop, i.e., how quickly the loop achieves lock, may be adjusted by modifying the frequency response characteristics of the outer loop filter 485.

The outer loop filter 485 also includes an input for initialization of the outer loop filter 485. The initial channel synchronization block 495 produces an output that sets the outer loop filter block 485 to values based on an initial synchronization procedure that depends on the particular communication system. For example, the synchronization procedure may depend on a known training sequence that is received by the RF demodulator 310 at the beginning of a transmission.

Block 490 converts the real filtered phase value produced by the outer loop filter 468 to a complex number, which typically has a unity gain associated with it.

At the multiplier block 410, each of the M values in the vector that is output by the FFT block 315 is multiplied by the single complex value produced by block 490. The phase of each of the M values in the vector is thereby adjusted by the same phase offset.

The channel equalizer block 340 may also include a weighting block 460. The weighting block 460, takes as inputs the noise estimate output of a noise estimator 405 and the M outputs of the inner loop filter 465. As noted above, each of the M outputs represents a tap weight. The weighting block 460 compares the noise estimate outputs with the tap weights to determine a signal to noise estimate for each frequency component.

The output of the weighting block 460 is a vector of length M that is used to alter the weight given to each of the M discrete frequencies in the spread frequency domain. In one embodiment, the output of the weighting block 460 may be a weighting vector containing ones and zeros. By performing an element by element multiplication on the weighting vector and the information in the spread frequency domain, certain frequencies in the spread frequency domain can be canceled out. For example, if a narrow band interferer is determined to be within a frequency range k by the noise estimator block 405, then the value or values in the weighting vector that correspond to the frequency range k may be set to zero so that values in this frequency range are effectively ignored in the inner and outer loops of the channel equalizer block 340. Certain frequencies in the spread frequency domain having weak signal components such as might occur from multipath nulls or from previous processing to remove narrowband interference may also be canceled out using the weighting vector. Canceling such frequencies out prevents the subsequent linear LMS process from generating excessive noise amplification.

The weighting vector is provided to the multiplier 420 of the inner loop and to the multiplier 470 in the outer loop. Alternatively, separate weighting vectors may be calculated for each of the inner and outer loops.

Figure 5:
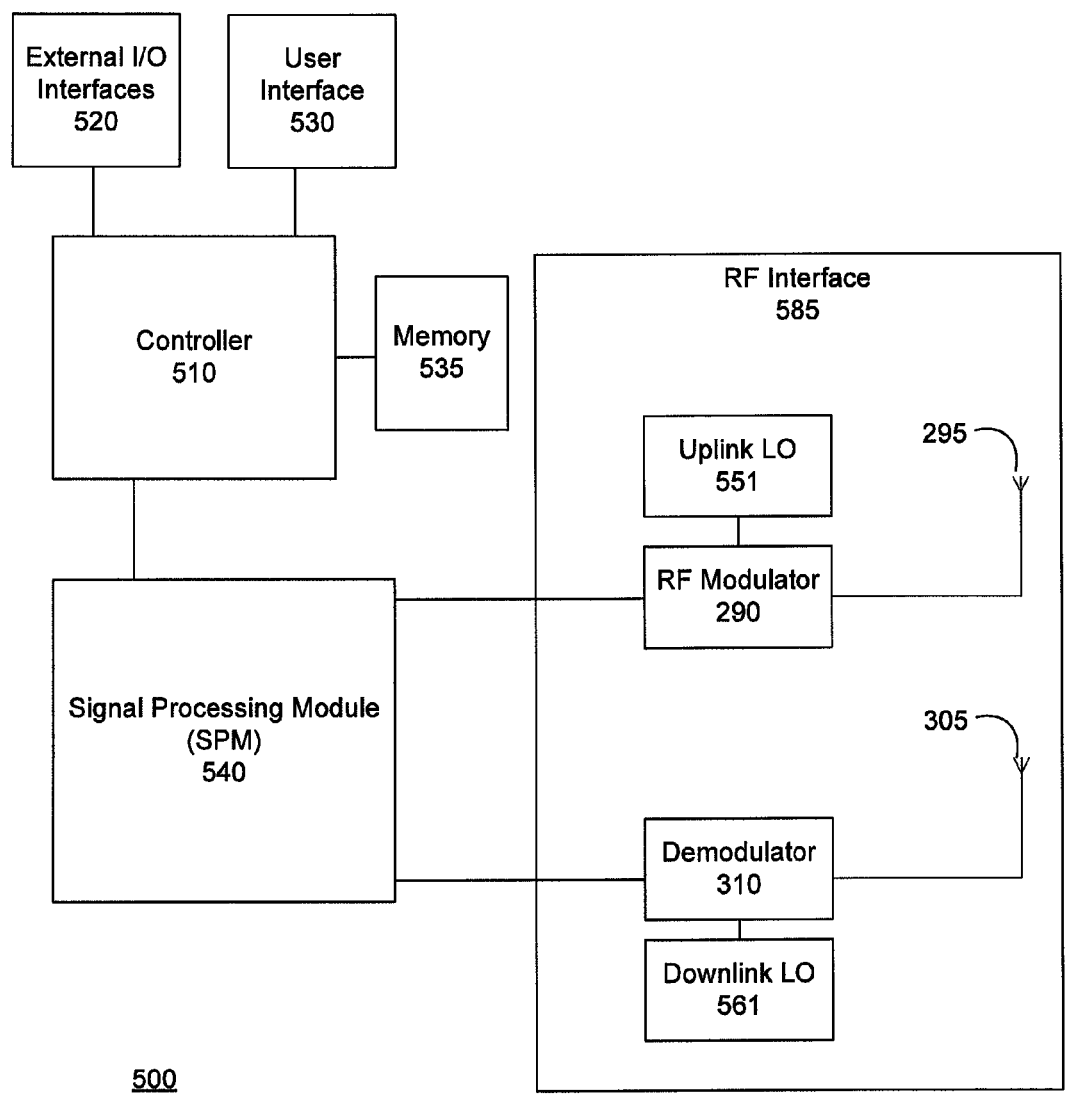
FIG. 5 is a block diagram of an OFDM communication device including a transmitter and a receiver according to an embodiment of the invention.

Referring now to FIG. 5, there is provided a block diagram of an OFDM communication device 500 in accordance with an embodiment of the present invention. The OFDM communication device 500 may be a small device, such as a portable device that can easily be carried by a user. Alternatively, the OFDM communication device 500 may be installed in a fixed location.

The OFDM communication device 500 may include a controller 510. The controller 510 may include one or more microprocessors, microcontrollers, application-specific integrated circuits (ASICs) and programmable devices, such as a field programmable gate arrays (FPGAs) or complex programmable logic devices (CPLDs). The controller 510 may also have access to memory 535. The memory 535 may include volatile memory, such as static or dynamic RAM, and non-volatile memory, such as ferroelectric memory, magnetoresistive memory, flash memory, or a hard disk drive. The memory 535 may be used to store program instructions (e.g., software code), calibration information, and other information required by the controller 510.

The controller 510 may also connect to one or more external I/O interfaces 520. Examples of external I/O interfaces include ports for USB, serial, Ethernet, and Firewire, among others. Such interfaces are well known to persons skilled in the art, and thus, will not be described in great detail herein. A user can interact with the controller 510 through the External I/O interfaces 520 to upgrade software code and to transfer information to and from the controller 510.

The memory 535 can include a computer-readable storage medium on which is stored one or more sets of instructions (e.g., software code) configured to implement one or more of the methodologies, procedures, or functions described herein. A computer-readable medium containing instructions may also be connected to the controller 510 via one of the external I/O interfaces 520. The instructions can also reside, completely or at least partially, within the controller 510. The controller 510 may execute the program instructions to perform the functions assigned to the controller 510. Alternatively, the methods, procedures, or functions described herein can be implemented using dedicated hardware implementations. Thus, the exemplary system is applicable to software, firmware, and hardware implementations.

The OFDM communication device 500 may include a user interface 530. The user interface 530 may include buttons, switches, knobs, and a keyboard that a user can use to interact with the controller 510. The user interface may also include a display, which provides status information to the user. A speaker and a microphone may also be included in the user interface 530 for the transmission and reception of sound information.

The controller 510 is connected to and communicates with a signal processing module (SPM) 540. Like the controller, the SPM 540 may include one or more microprocessors, microcontrollers, dedicated digital signal processors (DSPs), ASICs, and programmable devices, such as FPGAs and CPLDs. The SPM 540 need not be separate from the controller. The functions of the SPM 540 may be included in the controller 510.

The OFDM communication device 500 also includes an RF interface. There are many different possible methods of implementing the RF interface 585. Although FIG. 5 illustrates separate transmit 295 and receive 305 antennas, as is well known in the art, a single antenna may be shared by the receiver and the transmitter. Multiple transmit and/or receive antennas may also be used to provide for diversity transmission and reception and/or beam-forming.

The RF interface 585 includes an RF modulator 290 and a local oscillator 551. The function of the RF modulator 290 is to modulate data onto a carrier wave, i.e., an RF signal, derived from the uplink local oscillator 551. The data to be modulated is provided to the RF modulator 290 by the SPM 540. The RF signal, which carries the data, is amplified using an output power amplifier (not shown) and sent to the antenna 295. The uplink signal is thereby broadcast to other OFDM communication devices.

The RF interface 585 also includes an RF demodulator 290 and a downlink local oscillator 561. The downlink signal is received from the antenna 295 and may be amplified by an input power amplifier (not shown). The amplified input signal is then demodulated by the RF demodulator 290 using the downlink local oscillator 561. Data is thereby extracted from the downlink signal. The extracted data may be provided to the SPM 540 as digital samples.

All of the methods disclosed and claimed herein may be executed using a variety of different hardware devices. The SPM may execute the required functions to implement the described blocks of the transmitter 200 and the receiver 300. However, the steps of the above described methods need not be executed by the SPM 540. Many of the steps may instead be executed by a generic processor included in the OFDM communication device 500. Alternatively, portions of the disclosed methods may be performed by hardware that is not directly included in the OFDM communication device 500. For example, a device connected to the OFDM communication device 500 via the external I/O interfaces 520 may perform some of the disclosed functions.

Moreover, it will be apparent to those of ordinary skill in the art that variations with respect to the order of the sequence of the disclosed function blocks may be applied without departing from the concept, spirit, and scope of the invention. Further, function blocks may be combined with other function blocks to improve the efficiency of the described methods and additional function blocks may be added without departing from the concept, spirit, and scope of the invention.

All of the apparatus, methods, and algorithms disclosed and claimed herein can be made and executed without undue experimentation in light of the present disclosure. While the invention has been described in terms of preferred embodiments, it will be apparent to those of ordinary skill in the art that variations may be applied to the apparatus, methods, and sequence of steps of the method without departing from the concept, spirit, and scope of the invention. More specifically, it will be apparent that certain components may be added to, combined with, or substituted for the components described herein while the same or similar results would be achieved. All such similar substitutes and modifications apparent to one of ordinary skill in the art are deemed to be within the spirit, scope, and concept of the invention as defined.

What is claimed is:

1. A method for equalizing an orthogonal frequency division multiplexed (OFDM) signal having been encoded by spreading a plurality of transmitted subcarriers in the frequency domain using a plurality of orthogonal codes, comprising:
    receiving the OFDM signal at a receiver;
    demodulating at least a portion of the OFDM signal to produce demodulated information;
    producing a spread frequency domain representation of the demodulated information;
    determining an equalized spread frequency domain representation of the demodulated information by adjusting at least one of a power and a phase of the spread frequency domain representation for at least one frequency based on a plurality of equalization adjustment values;
    de-spreading the equalized spread frequency domain representation using the plurality of orthogonal codes to produce a de-spread frequency domain representation including a plurality of received subcarriers;
    determining a subcarrier value for each of the plurality of received subcarriers based on the de-spread frequency domain representation of the demodulated information;
    orthogonally spreading at said receiver the determined subcarrier values in the frequency domain using the plurality of orthogonal codes to produce a model spread frequency domain representation of the determined subcarrier values; and
    calculating a plurality of new equalization adjustment values based upon results of a comparison of the equalized spread frequency domain representation with the model spread frequency domain representation of the subcarrier values.

2. The method according to claim 1, wherein the plurality of new adjustment values are calculated according to a Least-Mean-Square (LMS) algorithm.

3. The method according to claim 1, wherein the step of producing the spread frequency domain representation of the demodulated information comprises performing a Fast Fourier Transform (FFT).

4. The method according to claim 1, further comprising the steps of:
    calculating a weighting function based upon an estimate of noise received by the receiver over a range of frequencies; and
    applying the weighting function to the equalized spread frequency domain representation to thereby adjust a power of the equalized spread frequency domain representation of at least one frequency.

5. The method according to claim 1, wherein the plurality of orthogonal codes are derived from a Walsh matrix.

6. The method according to claim 1, wherein the length of each of the plurality of orthogonal codes is greater than the number of received subcarriers.

7. A communication device comprising:
    a radio frequency (RF) demodulator configured to demodulate an RF signal formed from a plurality of transmitted subcarriers to produce demodulated digital information, where each of the transmitted subcarriers is encoded by a frequency spreading operation using one of a plurality of orthogonal codes; and
    a signal processing module configured to:
        produce a spread frequency domain representation of the demodulated digital information;
        generate an equalized spread frequency domain representation of the demodulated digital information by adjusting at least one of a power and a phase of the spread frequency domain representation of at least one frequency based on a plurality of equalization adjustment values;
        de-spread the equalized spread frequency domain representation of the demodulated digital information using the plurality of orthogonal codes to produce a de-spread frequency domain representation of the demodulated information including a plurality of received subcarriers;
        determine a subcarrier value for each of the plurality of received subcarriers based on the de-spread frequency domain representation of the demodulated information;
        orthogonally spread the determined subcarrier values in the frequency domain using the plurality of orthogonal codes to produce a model spread frequency domain representation of the determined subcarrier values; and
        calculate a plurality of new equalization adjustment values based upon results of a comparison of the equalized spread frequency domain representation with the model spread frequency domain representation of the subcarrier values.

8. The communication device according to claim 7, wherein the signal processing module is configured to calculate the plurality of new adjustment values according to a Least-Mean-Square (LMS) algorithm.

9. The communication device according to claim 7, wherein the signal processing module is configured to produce the spread frequency domain representation of the demodulated digital information by performing a Fast Fourier Transform (FFT) on the demodulated digital information.

10. The communication device according to claim 7, wherein the signal processing module is further configured to:
    calculate a weighting function based upon an estimate of noise received by the receiver over a range of frequencies;
    apply the weighting function to the equalized spread frequency domain representation to thereby adjust a power of the equalized spread frequency domain representation at at least one frequency.

11. The communication device according to claim 7, wherein the plurality of orthogonal codes are derived from a Walsh matrix.

12. A method for equalizing an orthogonal frequency division multiplexed (OFDM) signal having been encoded by spreading a plurality of transmitted subcarriers in the frequency domain using a plurality of orthogonal codes, comprising:
    receiving the OFDM signal at a receiver;
    demodulating at least a portion of the OFDM signal to produce demodulated information;
    producing a spread frequency domain representation of the demodulated information;
    determining an equalized spread frequency domain representation of the demodulated information by adjusting at least one of a power and a phase of the spread frequency domain representation for at least one frequency based on a plurality of adjustment values;
    de-spreading the equalized spread frequency domain representation using the plurality of orthogonal codes to produce a de-spread frequency domain representation including a plurality of received subcarriers;

determining a subcarrier value for each of the plurality of received subcarriers;

orthogonally spreading at said receiver the determined subcarrier values in the frequency domain using the plurality of orthogonal codes to produce a model spread frequency domain representation of the determined subcarrier values; and calculating a plurality of new adjustment values based upon the model spread frequency domain representation of the subcarrier values;

wherein the step of calculating the plurality of new adjustment values comprises:

calculating a plurality of expected error values based upon the model spread frequency domain representation of the subcarrier values and the equalized spread frequency domain representation; and calculating the plurality of new adjustment values based upon the plurality of expected error values.

13. The method according to claim 12, wherein the spread frequency domain representation is a first vector of complex values, each of the complex values representing the power and the phase at a particular frequency, and wherein the plurality of adjustment values is a second vector of complex values, and wherein the equalized spread frequency domain representation is a third vector of complex values generated by multiplying the spread frequency domain representation by the plurality of adjustment values on an element by element basis.

14. The method according to claim 13, wherein the model spread frequency domain representation of the subcarrier values is a fourth vector of complex values, and wherein the plurality of expected error values is a fifth vector of complex values calculated by determining a difference between the equalized spread frequency domain representation and the model spread frequency domain representation on an element by element basis.

15. The method according to claim 14, wherein the plurality of new adjustment values is a sixth vector of complex values and the step of calculating the plurality of new adjustment values comprises:

determining an adaptation vector by multiplying the plurality of expected error values by a real scaling value; and adding the adaptation vector to the plurality of adjustment values on an element by element basis.

16. The method according to claim 14, further comprising the steps:

determining an average phase error for the equalized spread frequency domain representation based upon the plurality of expected error values; and adjusting a composite phase of the equalized spread frequency domain representation according to the determined average phase error.

17. A communication device comprising:

a radio frequency (RF) demodulator configured to demodulate an RF signal formed from a plurality of transmitted subcarriers to produce demodulated digital information, where each of the transmitted subcarriers is encoded by a frequency spreading operation using one of a plurality of orthogonal codes; and a signal processing module configured to:

produce a spread frequency domain representation of the demodulated digital information;

generate an equalized spread frequency domain representation of the demodulated digital information by adjusting at least one of a power and a phase of the spread frequency domain representation of at least one frequency based on a plurality of adjustment values;

de-spread the equalized spread frequency domain representation of the demodulated digital information using the plurality of orthogonal codes to produce a de-spread frequency domain representation of the demodulated information including a plurality of received subcarriers;

determine a subcarrier value for each of the plurality of received subcarriers;

orthogonally spread the determined subcarrier values in the frequency domain using the plurality of orthogonal codes to produce a model spread frequency domain representation of the determined subcarrier values; and calculate a plurality of new adjustment values based upon the model spread frequency domain representation of the subcarrier values;

wherein the signal processing module is further configured to:

calculate a plurality of expected error values based upon the model spread frequency domain representation of the subcarrier values and the equalized spread frequency domain representation; and calculate the plurality of new adjustment values based upon the plurality of expected error values.

18. The communication device according to claim 17, wherein the spread frequency domain representation is a first vector of complex values, each of the complex values representing the power and the phase at a particular frequency, and wherein the plurality of adjustment values is a second vector of complex values, and wherein the equalized spread frequency domain representation is a third vector of complex values that the signal processing module is configured to generate by multiplying the spread frequency domain representation by the plurality of adjustment values on an element by element basis.

19. The communication device according to claim 18, wherein the model spread frequency domain representation of the subcarrier values is a fourth vector of complex values, and wherein the plurality of expected error values is a fifth vector of complex values that the signal processing module is configured to calculate by determining a difference between the equalized spread frequency domain representation and the model spread frequency domain representation on an element by element basis.

20. The communication device according to claim 19, wherein the plurality of new adjustment values is a sixth vector of complex values, and wherein the signal processing module is configured to calculate the plurality of new adjustment values by:

determining an adaptation vector by multiplying the plurality of expected error values by a real scaling value; and adding the adaptation vector to the plurality of adjustment values on an element by element basis.

21. The communication device according to claim 19, wherein the signal processing module is configured to:

determine an average phase error for the equalized spread frequency domain representation based upon the plurality of expected error values; and adjust a composite phase of the equalized spread frequency domain representation according to the determined average phase error.

22. A non-transitory computer-readable medium having stored thereon computer-executable instructions, which when executed by a machine, cause the machine to perform the following operations:
demodulating at least a portion of an orthogonal frequency division multiplexed (OFDM) signal to produce demodulated information, the OFDM signal having been encoded by spreading a plurality of transmitted subcarriers in the frequency domain using a plurality of orthogonal codes;
transforming the demodulated information to produce a spread frequency domain representation of the demodulated information;
determining an equalized spread frequency domain representation of the demodulated information by adjusting at least one of a power and a phase of the spread frequency domain representation of at least one frequency based on a plurality of equalization adjustment values;
de-spreading the equalized spread frequency domain representation using the plurality of orthogonal codes to produce a de-spread frequency domain representation including a plurality of received subcarriers;
determining a subcarrier value for each of the plurality of received subcarriers based on the de-spread frequency domain representation of the demodulated information;
orthogonally spreading at said receiver the determined subcarrier values in the frequency domain using the plurality of orthogonal codes to produce a model spread frequency domain representation of the determined subcarrier values; and
calculating a plurality of new equalization adjustment values based upon results of a comparison of the equalized spread frequency domain representation with the model spread frequency domain representation of the subcarrier values.

* * * * *